US009845156B2

(12) United States Patent
Sagare et al.

(10) Patent No.: US 9,845,156 B2
(45) Date of Patent: Dec. 19, 2017

(54) AIRCRAFT ARMREST RAIL ROLLER LINKAGE APPARATUS

(71) Applicant: B/E Aerospace, Inc., Wellington, FL (US)

(72) Inventors: Rahul R. Sagare, Pembroke Pines, FL (US); Sean Hames, Weston, FL (US)

(73) Assignee: B/E Aerospace, Inc., Wellington, FL (US)

( * ) Notice: Subject to any disclaimer, the term of this patent is extended or adjusted under 35 U.S.C. 154(b) by 18 days.

(21) Appl. No.: 15/148,531

(22) Filed: May 6, 2016

(65) Prior Publication Data
US 2016/0332732 A1  Nov. 17, 2016

Related U.S. Application Data

(60) Provisional application No. 62/159,435, filed on May 11, 2015.

(51) Int. Cl.
| | |
|---|---|
| *F16M 13/00* | (2006.01) |
| *B64D 11/06* | (2006.01) |
| *A47C 7/54* | (2006.01) |
| *B60N 2/46* | (2006.01) |

(52) U.S. Cl.
CPC .......... *B64D 11/0644* (2014.12); *A47C 7/54* (2013.01); *B60N 2/464* (2013.01)

(58) Field of Classification Search
CPC ....... B64D 11/0644; A47C 7/54; A47C 7/543; B60N 2/464; B60N 2/4626; B60N 2/4646; B60N 2/4653; B60N 2/4805; B60N 2/4808; B60N 2/482; B60N 2/4829; F16C 29/0626; F16C 23/00; F16C 23/06

USPC ....... 248/413, 405, 157, 421, 161, 132, 129, 248/327, 243–246; 16/90–92, 86 C, 102, 16/105, 101, 97; 297/411.35–411.36; 384/58–59, 54, 50, 57, 10
See application file for complete search history.

(56) References Cited

U.S. PATENT DOCUMENTS

| | | | | |
|---|---|---|---|---|
| 2,650,387 | A | * | 9/1953 | Foss .................... E05D 15/0691 16/91 |
| 2,940,112 | A | * | 6/1960 | Riser ................... E05D 15/0634 16/105 |
| 3,664,333 | A | * | 5/1972 | Hill ................................ 601/102 |
| 3,912,224 | A | * | 10/1975 | Castoe .................. B25B 27/304 254/10.5 |

(Continued)

*Primary Examiner* — Christopher E Garft
(74) *Attorney, Agent, or Firm* — Shumaker, Loop & Kendrick, LLP

(57) ABSTRACT

An aircraft armrest may incorporate a rail roller linkage. The roller linkage may include an armrest plate, a rail attached to an aircraft seat assembly, a top roller link, and a bottom roller link. The top roller link may have a threaded upper adjustment cylinder, a pivot joint, and a pair of grooved rollers diagonally disposed on either side of the pivot. The bottom roller link may have an unthreaded lower adjustment cylinder, a pivot joint, and a pair of grooved rollers diagonally disposed on either side of the pivot. The grooved rollers may mesh with the rail. The roller linkage may include a roller adjustment screw, having a threaded portion, and extending through both of the adjustment cylinders. A compression spring may bias the roller link around the rail and may be disposed between the top roller link and the bottom roller link and surrounding the roller adjustment screw.

1 Claim, 11 Drawing Sheets

(56) References Cited

U.S. PATENT DOCUMENTS 7,628,361 B2 * 12/2009 Gan ................... F16M 11/24
248/132
7,703,242 B2 * 4/2010 Goebel ............... E05D 15/0621
16/102

* cited by examiner

AIRCRAFT ARMREST RAIL ROLLER LINKAGE APPARATUS

CROSS-REFERENCE TO RELATED APPLICATIONS

This application is a non-provisional United States patent application which traces priority to, claims the full benefit of, and expressly incorporates by reference the entirety of U.S. provisional application No. 62/159,435, filed on May 11, 2015.

TECHNICAL FIELD AND BACKGROUND OF THE INVENTION

The present invention relates generally to armrest assemblies and more particular to armrest roller mechanisms for use in passenger vehicles. The invention is an armrest rail roller linkage apparatus which assures positive contact between the rail and roller of an armrest assembly.

Armrests have become standard features in vehicle assemblies, particularly passenger vehicles such as automobiles, trains, and aircraft. Armrests provide passengers with the comfort of resting their arms and also may provide a demarcation between adjacent seating arrangements. However, it is at times necessary to move an armrest for comfort or to stow the armrest. A passenger may require that the armrest be located in a different position such as for ingress/egress from a seating arrangement or for other purposes. As such, armrests may include an assembly whereby rollers roll along a rail. The rollers may be attached to a linkage which is attached to the arm rest. According to such an arrangement known in the art, the roller allows the armrest to roll from one position to another position to accommodate the desires of the passenger.

Because armrests such as described above move along a rail from one position to the next, the rollers may become dislodged or misaligned from the rail. Such dislodgment/misalignment may result in instability of the armrest, limited mobility of the armrest, or even detachment of the armrest. Such dislodgment is especially common where the armrest assembly is deployed in a seating arrangement in an aircraft where forces in many directions, such as up and down, are frequently exerted on the arm rest. These forces include frequent movement of the armrest from one position to the next and external forces exerted by the passenger vehicle. In such cases, armrest maintenance and/or replacement are a frequent problem in the art.

As a result of such problems in the art, prior art arm rest roller designs may use one of two designs. According to one prior art design, the rollers are machined according to very tight tolerances in cooperation with the rail. Such designs have no adjustment mechanisms. However, in addition to being very expensive and difficult to machine, manufacture, and install with tight tolerance requirements, the rollers may still become dislodged, loosened, misaligned, or tightened/stuck so as to be non-functional after being exposed to repeated forces associated with armrest and vehicle movement.

Thus, another prior art design attempts to correct the aforementioned design by allowing for adjustment of linkages and the rollers. Such designs use multi-point adjustments in order to precisely configure the rollers around the rail and also to allow for replacement and readjustment. Unfortunately, such prior art designs require time consuming skilled labor. It is common for such designs to require 15 minutes or more of technician time per armrest adjustment. For a passenger seat having two armrests, this results in 30 minutes of adjustment labor per seat. Commonly, vehicles such as aircraft provide seating for dozens or even hundreds of passengers. Thus, arm rest adjustment can consume considerable time. This results in aircraft downtime.

As a result, there is a need in the art for an armrest roller assembly that may be quickly, safely, and easily adjusted. There is also a need in the art for an armrest roller assembly that requires little adjustment or at least less frequent adjustment to correct deviations and wear in roller action due to frequent movement and forces applied to armrests.

BRIEF SUMMARY OF THE INVENTION

It is therefore an object of the present invention to provide an armrest roller assembly that easily and efficiently provides for rolling movement of the armrest. It is a further object of the invention to provide an armrest roller assembly that resists dislodgment and/or misalignment and that self corrects to avoid such misalignments. It is still a further object of the present invention to provide an armrest roller assembly that may adjusted by a single adjustment when necessary and that may be quickly adjusted.

To achieve the foregoing and other aspects and advantages, in one embodiment of the invention, an armrest roller assembly is provided which includes a linkage with grooved rollers mounted on the armrest base. The rail roller linkage mechanism includes upper and lower adjustment cylinders, roller adjustment screw, and compression spring. The linkages utilize a link pivot on both sides of roller linkage. This link pivot arrangement provides a scissor hinge effect which provides continuous uniform roller adjustment maintaining constant positive rail grip on all four rollers as operational wear occurs. This pivot arrangement replaces all multi-point adjustments used in the prior art and replaces with a fixed pivot and single bold/screw adjustment. The invention thus allows for self-adjustment of roller and provides positive contact and pressure of rollers on rail and positive grip during operation.

According to such an arrangement, each rail roller linkage mechanism has only single roller adjustment screw on one side which provides easy and quick roller pressure adjustment and does not require removing any seat additional seat components. According to another aspect of the invention, the rail roller linkage mechanism has a compression spring which provides pre-tension on the roller adjustment screw and continues to lock the rail roller linkage in position as the rollers wear over time. The compression spring is inserted between the upper and lower link, which exerts pressure on adjustment bolt threads and acts as self-locking (existing mechanisms do not have any self-locking features and require periodic adjustments of the rollers or complete replacement). According to another aspect of the current invention, the rail roller linkage does not show any measurable looseness or failure after 1000 up-down cycles.

According to an embodiment of the invention, an aircraft armrest rail roller linkage apparatus includes an armrest plate for attaching to an armrest assembly. A rail may be attached to an aircraft seat assembly. A top roller link may be attached to the armrest plate. The top roller link may have an upper adjustment cylinder that is threaded and also may have a pivot joint and a pair of grooved rollers diagonally disposed on either side of the pivot, the grooves meshing with the rail. A bottom roller link may be attached to the armrest plate. The bottom roller link may have a lower adjustment cylinder that is unthreaded and also may also have a pivot joint and a pair of grooved rollers diagonally disposed on either side of the pivot, the grooves meshing with the rail. A roller adjustment screw may be included which has a threaded portion and extends through both the upper and the lower adjustment cylinders. The threaded portion of the roller adjustment screw may mesh with the threaded portion of the upper adjustment cylinder. An embodiment of the invention may include a compression spring which biases the top and bottom roller links around the rail. The compression ring may be disposed between the top roller link and the bottom roller link and may surround the roller adjustment screw. Further, the respective pivot joints of the top roller link and the bottom roller link may be positioned on opposite sides of the rail.

According to another embodiment of the invention, the rail roller linkage mechanism has a single point roller adjustment screw with compression spring to preload rollers and maintain roller grip on the rail for longer life cycle without further adjustment.

According to another embodiment of the invention, the rail roller linkage mechanism is used as a base armrest mechanism for seat armrest. The rail roller linkage mechanism will include two sets of rail rollers parallel mounted on composite panel which makes up the arm rest base. Accordingly, any customized upholstered armrest can fit on standard base with two screws and washers.

According to another embodiment of the invention, the base roller mechanism can be standard for all seats and detachable from the armrest box. Accordingly when the roller assembly is serviced, only top armrest box need to be replaced according to requirement. This may lead to reduce waste of labor and parts. According to such an embodiment, when deployed, field maintenance can keep stock of finish arm boxes to avoid delay in replacement and thereby further reduce downtime. Alternatively, the invention contemplates that the design may configured as a retrofit for existing armrests (which currently utilize the armrest assembly integrated with the movement mechanisms).

According to another embodiment of the invention, an aircraft armrest rail roller linkage apparatus may include a plurality of rollers meshing with a rail and attached to a pair of links for providing smooth uninterrupted movement of the aircraft armrest rail roller linkage about the rail. The pair of links may be pivotally connected to each other. A single adjustment screw may be disposed between the pair of links for adjusting the pressure exerted by the rollers on the rail. Further, a compression spring may be disposed around the single adjustment screw and between the pair of links for providing pre-tension on the single adjustment screw and for holding the plurality of rollers in position about the rail as the plurality of rollers wear over time.

According to another embodiment of the invention, the aircraft armrest rail roller linkage does not show any measurable looseness or failure after 1000 up-down cycles.

According to another embodiment of the invention, the aircraft armrest rail roller linkage may be fully adjusted to an optimum pressure in less than three minutes by an aircraft technician.

According to one embodiment of the invention, an aircraft armrest rail roller linkage apparatus may include a rail attached to an aircraft seat, a pair of links pivotally linked to each other by a single scissor hinge, a plurality of rollers attached to the pair of links and disposed on either side of the rail, a single adjustment screw spaced apart from the scissor hinge and disposed between each one of the links for adjusting the pressure exerted by the plurality of rollers on the rail, and a compression spring positioned around the single adjustment screw for maintaining constant positive grip on the rail by all of the plurality of rollers.

According to another embodiment of the invention, the pair of links may include a top roller link and a bottom roller link. Further, an upper adjustment cylinder may be disposed in the top roller link and a lower adjustment cylinder may be disposed on the bottom roller link. The adjustment screw may pass through the upper adjustment cylinder and through the lower adjustment cylinder.

According to another embodiment of the invention, the adjustment screw may have an outwardly treaded portion, the upper adjustment cylinder may have an inwardly threaded portion, and the outwardly threaded portion of the upper adjustment screw may mesh with the inwardly threaded portion of the upper adjustment cylinder.

According to another embodiment of the invention, the top link and the bottom link may be attached to an armrest plate and the armrest plate may be attached to an armrest.

According to another embodiment of the invention, each one of the plurality of rollers may include grooves. In such an embodiment, the grooves may be the portion of the rollers which meshes with the rail.

According to another embodiment of the invention, the aircraft linkage may further include a retainer ring attached to the adjustment screw at an end of the adjustment screw which exits the bottom link.

According to one embodiment of the invention, an aircraft armrest rail roller linkage apparatus may include an armrest plate for attaching to an armrest assembly, a rail attached to an aircraft seat assembly, and a top roller link attached to the armrest plate having an upper adjustment cylinder that may be threaded and also may have a pivot joint and a pair of grooved rollers diagonally disposed on either side of the pivot, the grooves meshing with the rail. According to such an embodiment, the aircraft armrest rail roller linage apparatus may also have a bottom roller link attached to the armrest plate, having a lower adjustment cylinder that may be unthreaded and may also have a pivot joint and a pair of grooved rollers diagonally disposed on either side of the pivot, the grooves meshing with the rail. Such an embodiment may further include a roller adjustment screw. The roller adjustment screw may have a threaded portion and may extend through both the upper and the lower adjustment cylinders. The threaded portion of the roller adjustment screw may mesh with the threaded portion of the upper adjustment cylinder. Such an embodiment may further include a compression spring, biasing the top and bottom roller links around the rail and the compression spring may be disposed between the top roller link and the bottom roller link and may surround the roller adjustment screw. Further still, the respective pivot joints of the top roller link and the bottom roller link may be positioned on opposite sides of the rail.

BRIEF DESCRIPTION OF THE DRAWINGS

Features, aspects and advantages of the present invention are understood when the following detailed description of the invention is read with reference to the accompanying drawings, in which.

DETAILED DESCRIPTION OF THE INVENTION

Prior Art FIGS. 1, 1A, 2, and 2A

Figure 1:
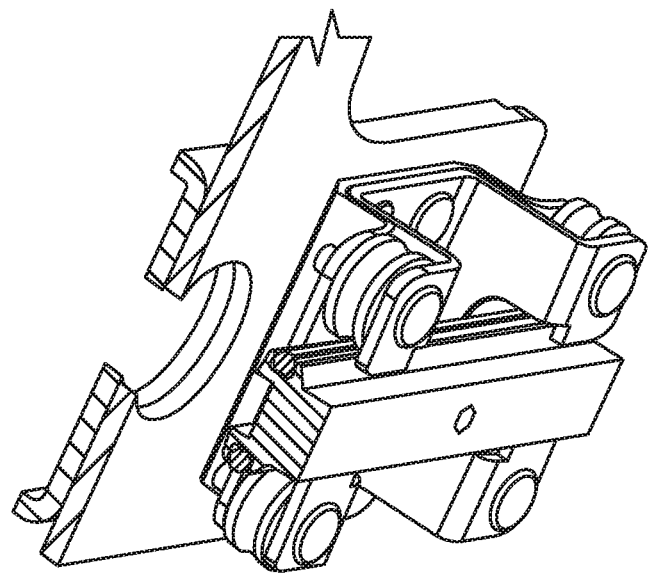
FIG. 1 is a perspective view of a prior art rail and roller assembly having no adjustment means.
Figure 1A:
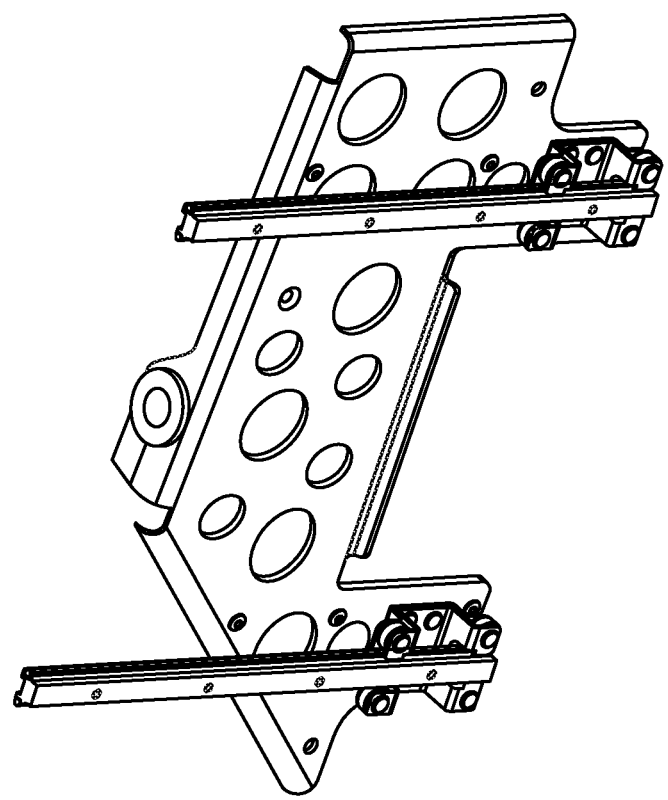
FIG. 1A is a perspective view of a prior art rail and roller assembly having no adjustment means.
Figure 2:
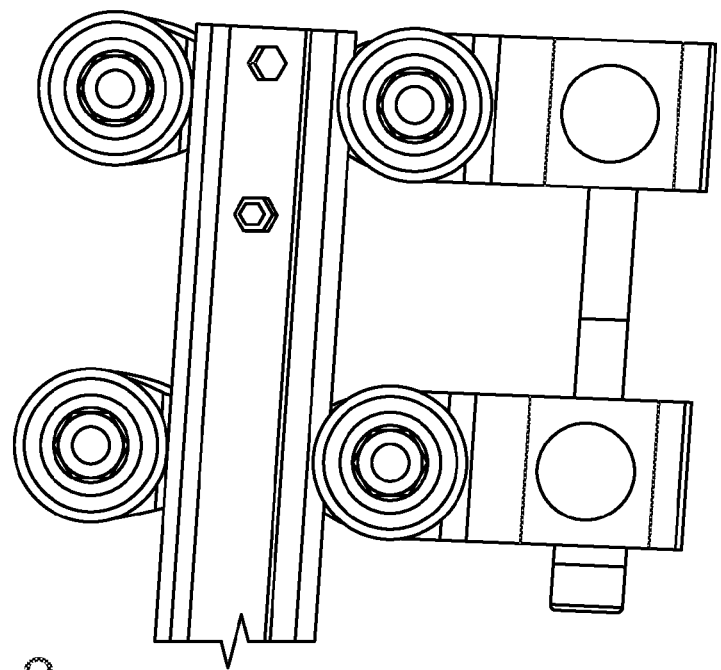
FIG. 2 is a perspective view of a prior art rail and roller assembly having multiple adjustment means.
Figure 2A:
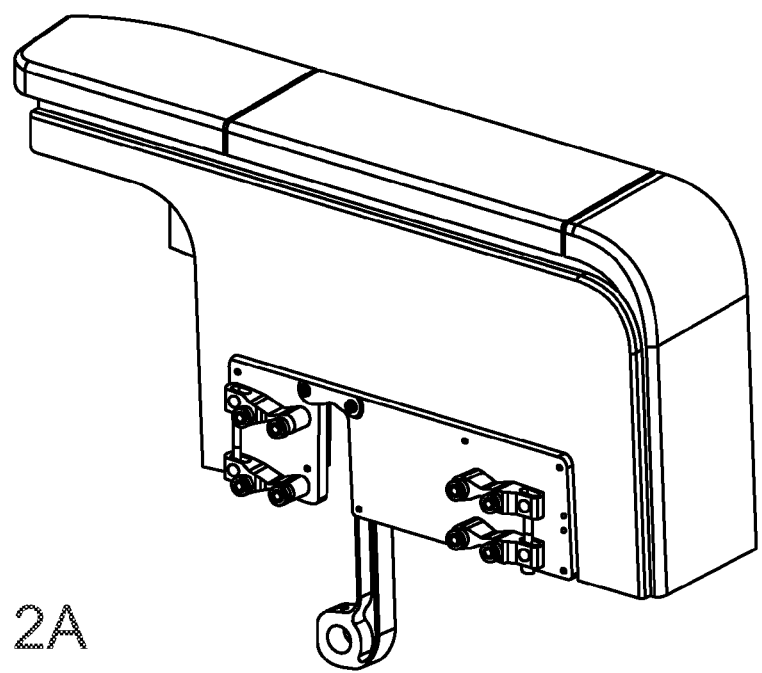
FIG. 2A is a perspective view of a prior art rail and roller assembly having multiple adjustment means integrated into an armrest assembly.
Figure 3:
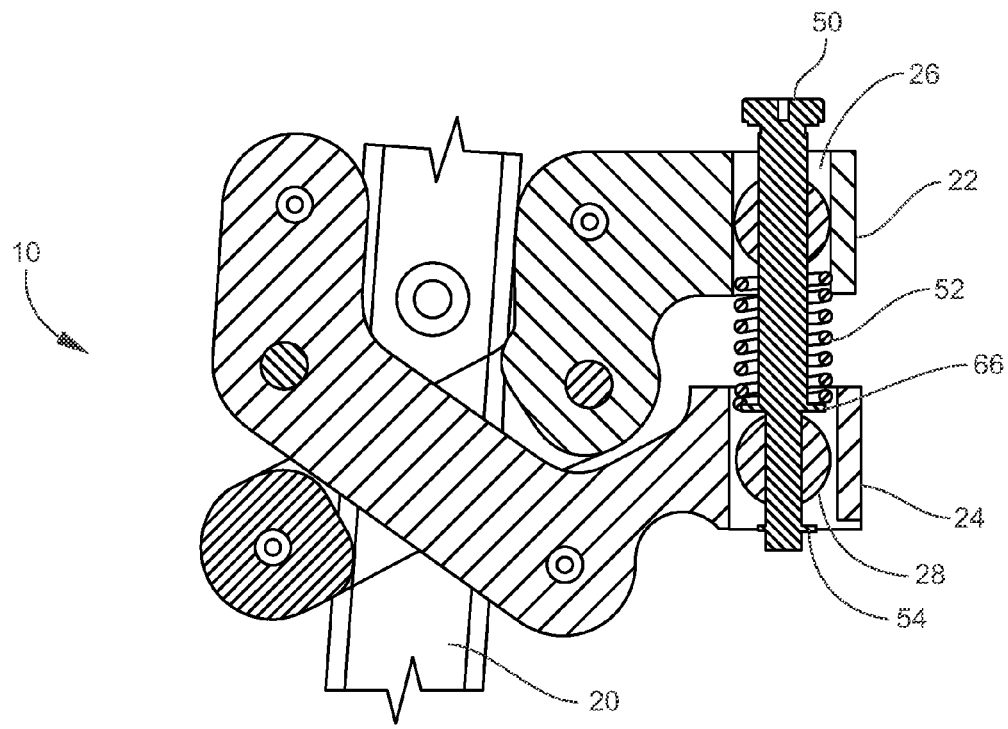
FIG. 3 is a side view of an embodiment of the present invention showing a cutaway view of the adjustment cylinder.
Figure 4:
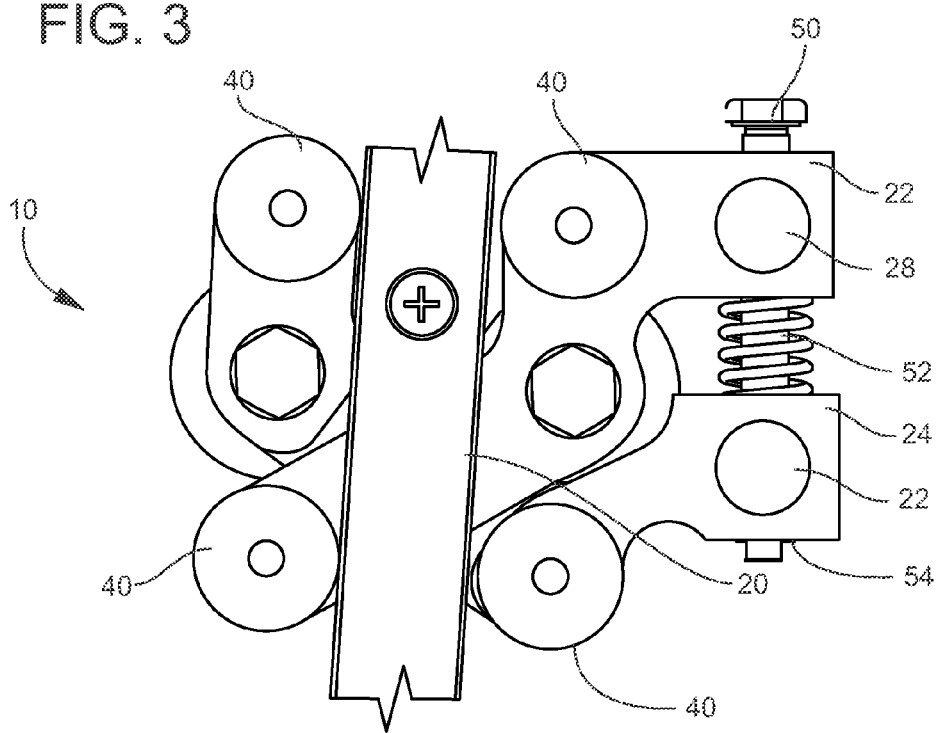
FIG. 4 is a side view of an embodiment of the present invention.

Referring to the prior art figures, FIGS. 1, 1A, show a roller and rail assembly for an arm rest that does not include any adjustment means. Because there is no adjustment means, functionality of the prior art mechanism of FIG. 1 and FIG. 1A requires great deal of manufacturing accuracy. Further, as the rails and/or rollers wear over time, there is no means for adjustment and the roller swill wobble on the rails. Referring to the prior art FIGS. 2 and 2A, the roller and rail assembly of the prior art is shown with several adjustment means. In order to align the assembly of FIG. 2, pressure adjustment bolt and at least a pair of manual adjustment screws must be manipulated. Such adjustment may take as long as 15 minutes per armrest assembly. As shown in FIG. 2A, the armrest roller mechanism of the prior art is fully integrated into the armrest assembly. Adjustments require significant downtime in removing the entire assembly.

Preferred Embodiment and Best Mode FIGS. 3-12

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 11:
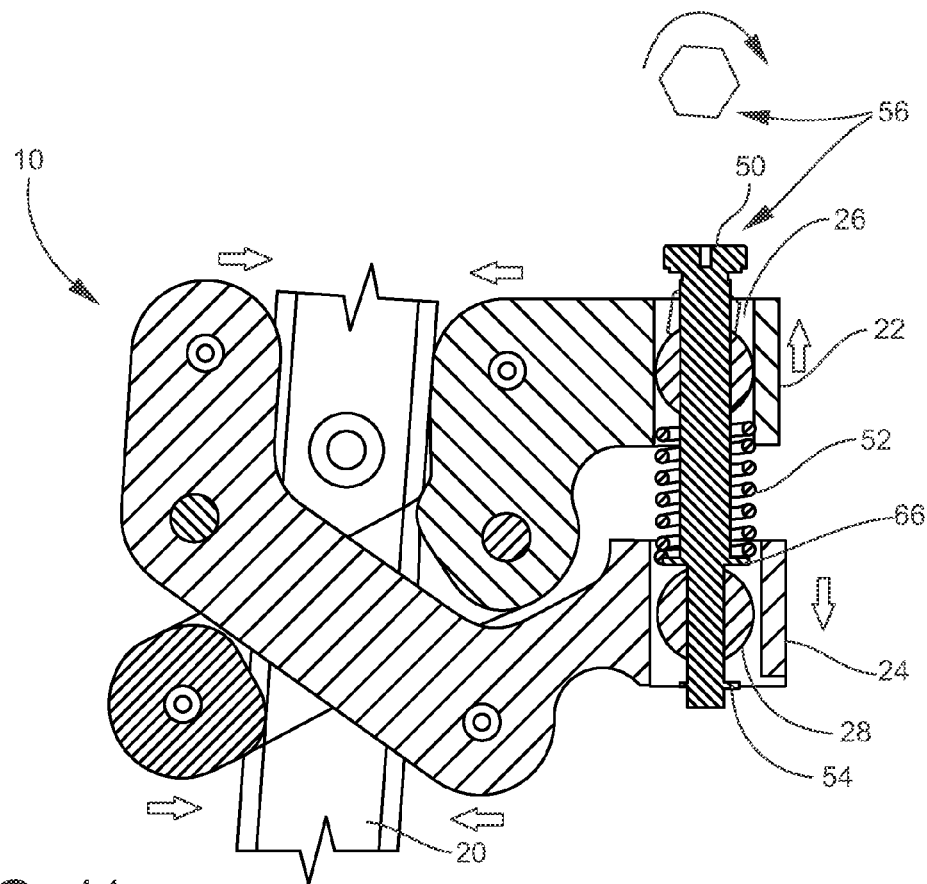
FIG. 11 is a side view of an embodiment of the present invention showing a cutaway view of the adjustment cylinder and movement of the adjustment screw and pivots.
Figure 12:
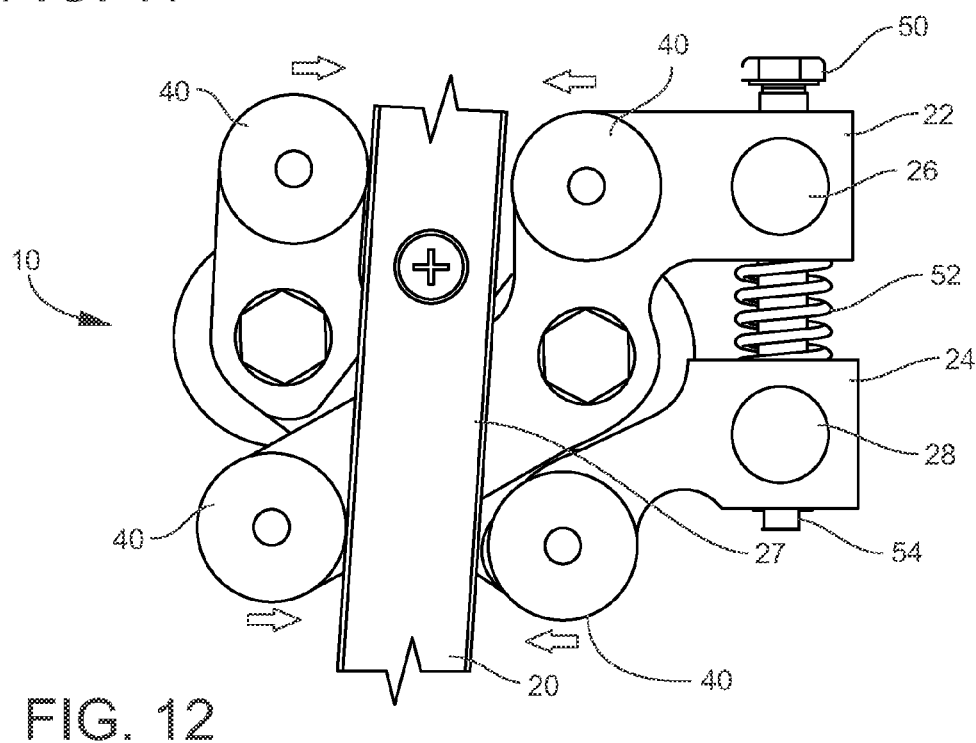
FIG. 12 is a side view of an embodiment of the present invention showing movement of the adjustment screw and pivots.

Referring to the FIGS. 3-12, provided herein are various embodiments of the rail roller linkage mechanism 10 of the present invention. The designed described below allows for armrest roller adjustment in as little as 3 minutes per side. The rail roller linkage mechanism 10 includes a rail 20 onto which grooved rollers 40 roll. The grooved rollers 40 are held by top roller link 22 and bottom roller link 24. The links 22, 24, respectively, includes upper 26 and lower 28 adjustment cylinders. Further, roller adjustment screw 50 extends through the cylinders 26, 28 and compression spring 52 resides between the cylinders and around portions of the screw 50. As shown in FIGS. 11 and 12, roller links 22 and 24 are preloaded by compression spring 52 and push apart in a direction parallel to the adjustment screw 50 and all rollers 40 make initial contact with rail 20.

Figure 5:
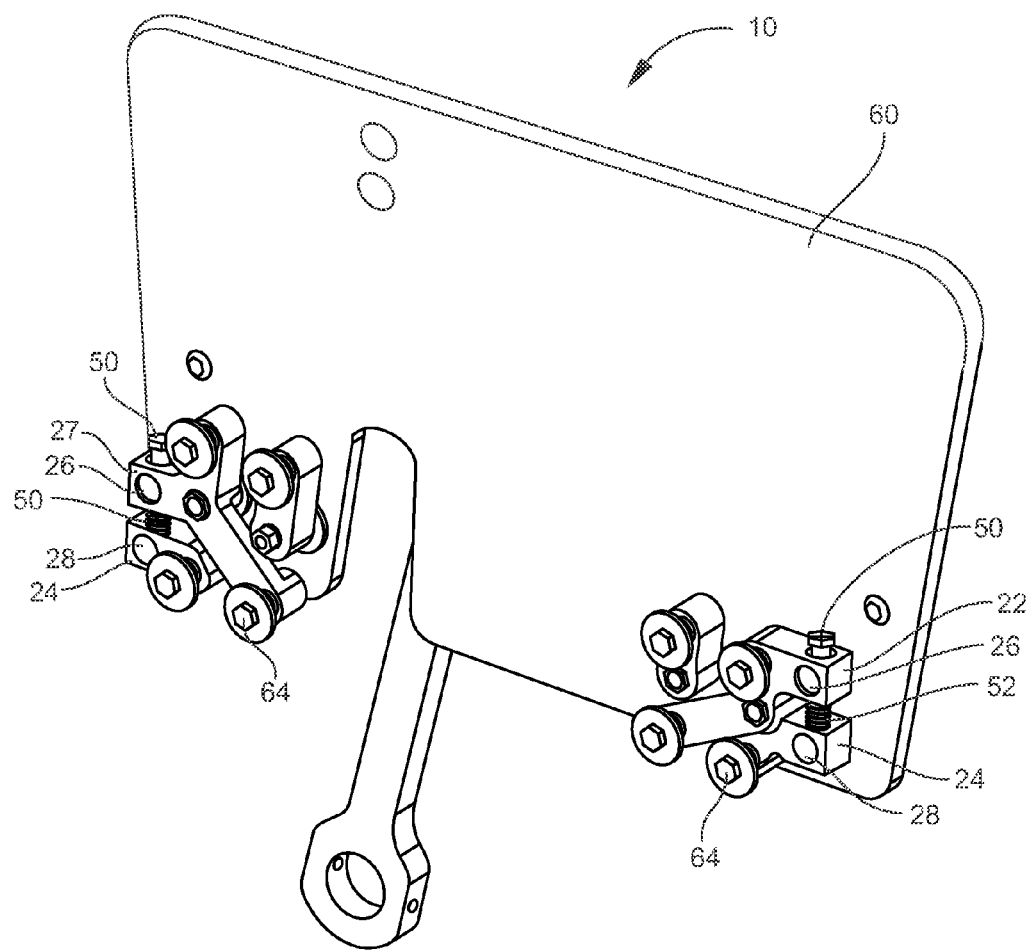
FIG. 5 is a front side perspective view of an embodiment of the invention.
Figure 6:
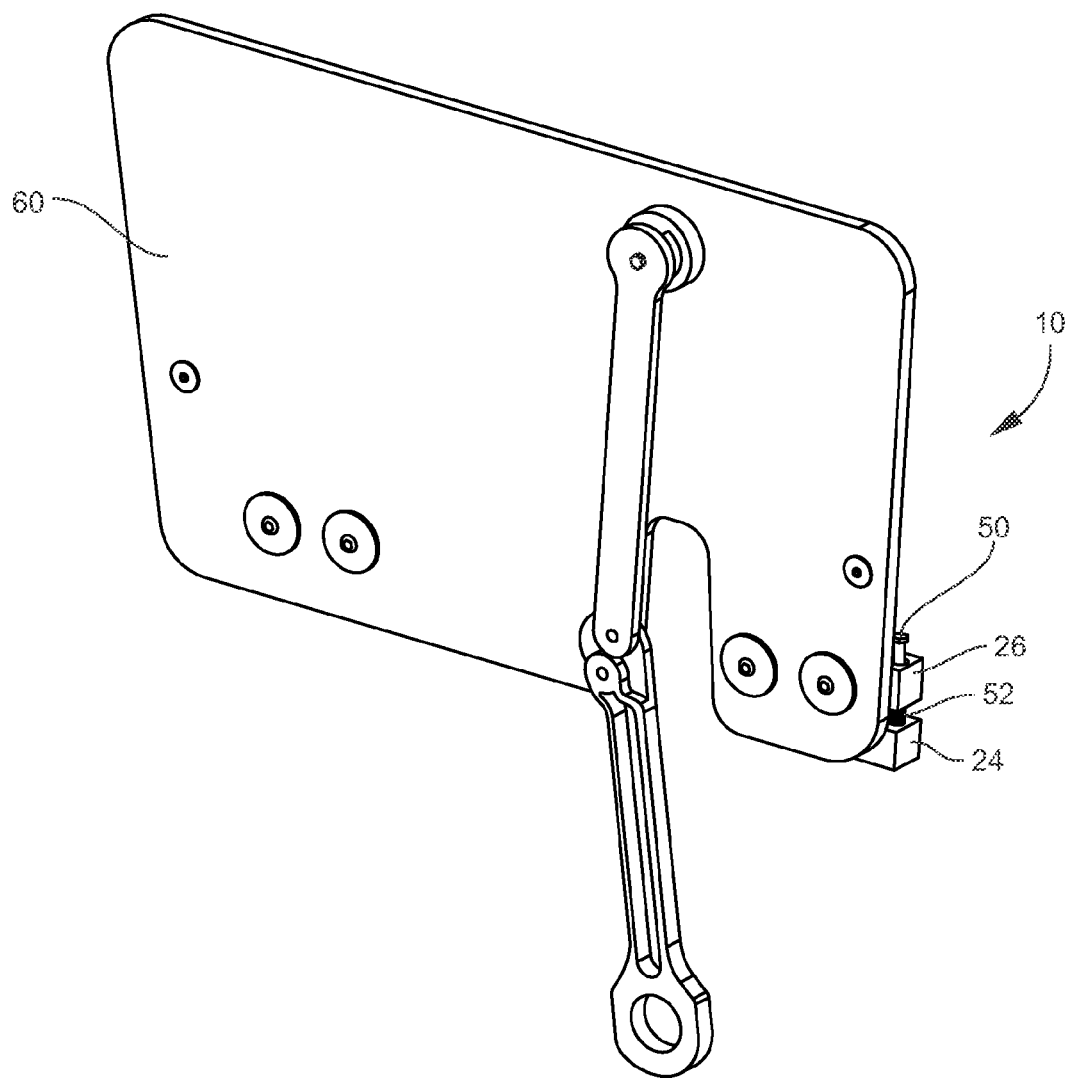
FIG. 6 is a rear side perspective view of an embodiment of the invention.

As shown in FIGS. 5 and 6, an armrest plate 60 may be attached to the rail roller linkage mechanism 10.

Figure 7:
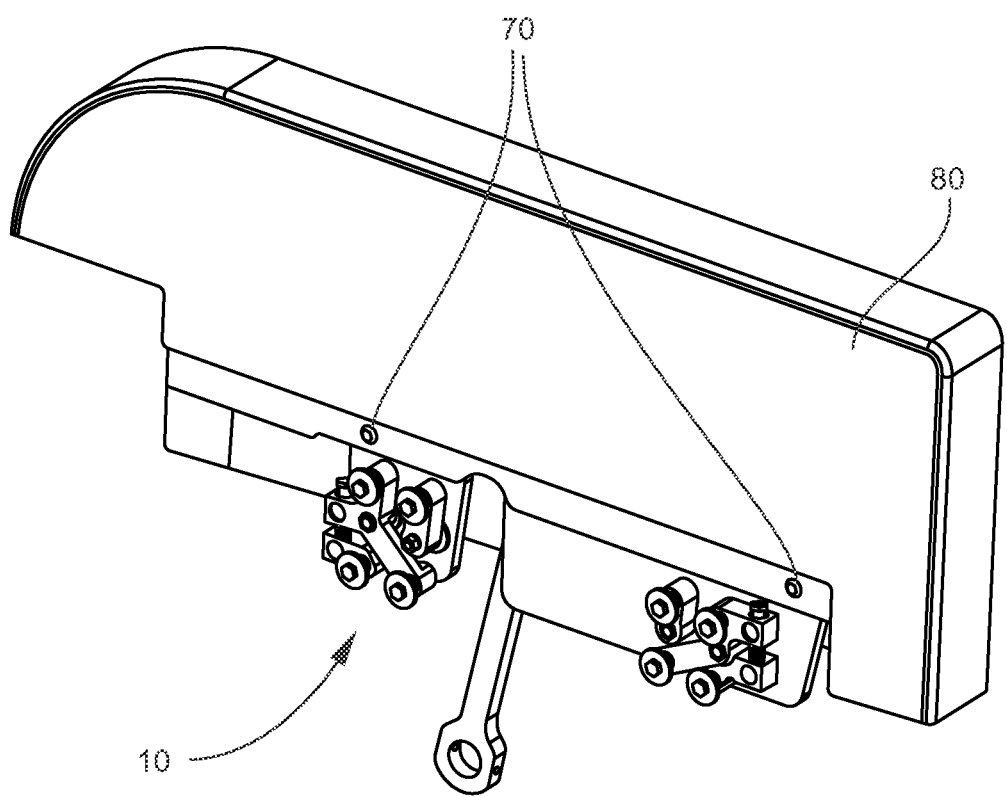
FIG. 7 is a front side perspective view of an embodiment of the invention showing the roller mechanism attached to the armrest assembly.

As shown in FIG. 7, the rail roller linkage mechanism 10 may be attached to an armrest 80 using screws 70.

Figure 8:
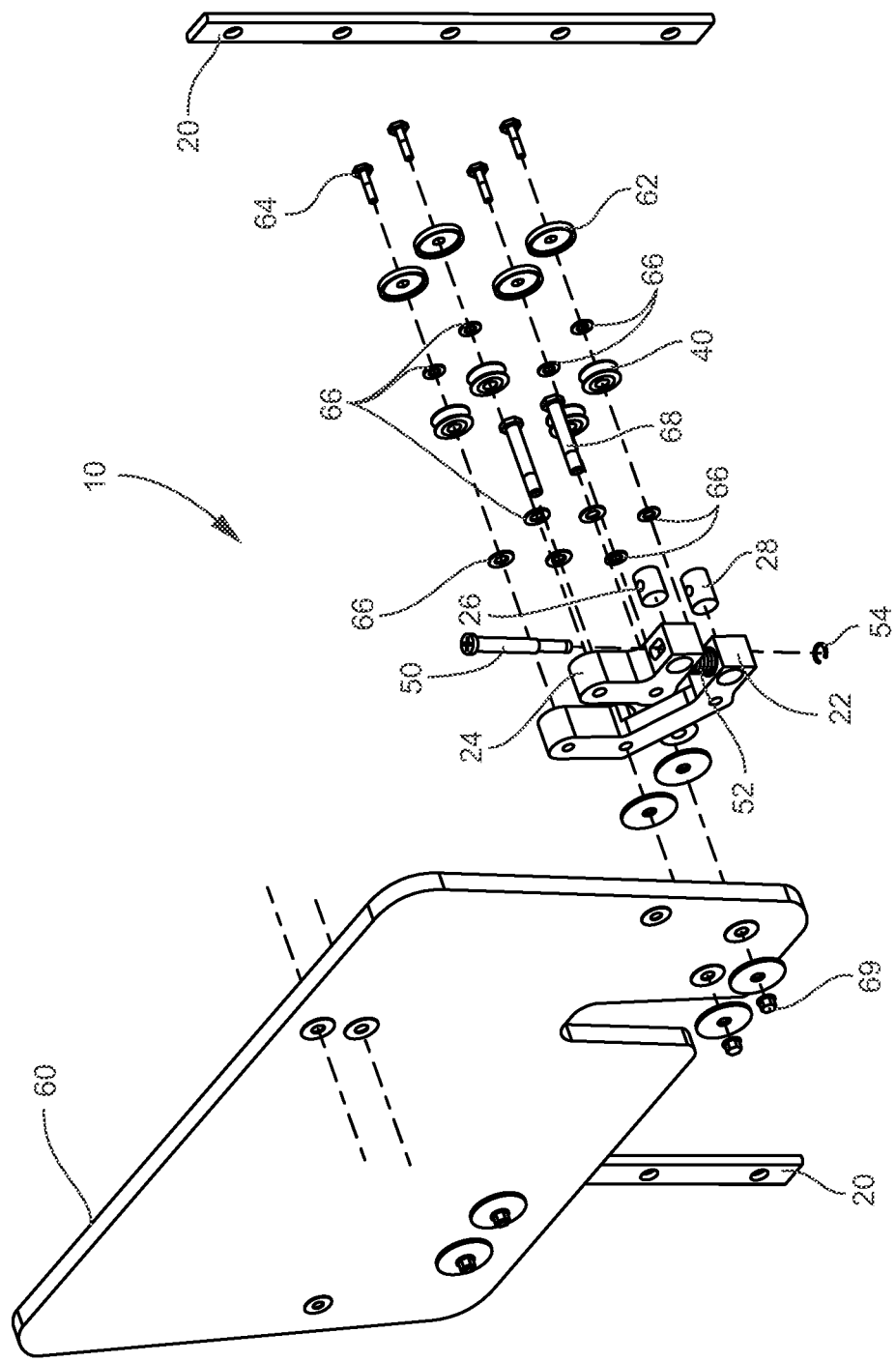
FIG. 8 is an exploded view of an embodiment of the invention.
Figure 9:
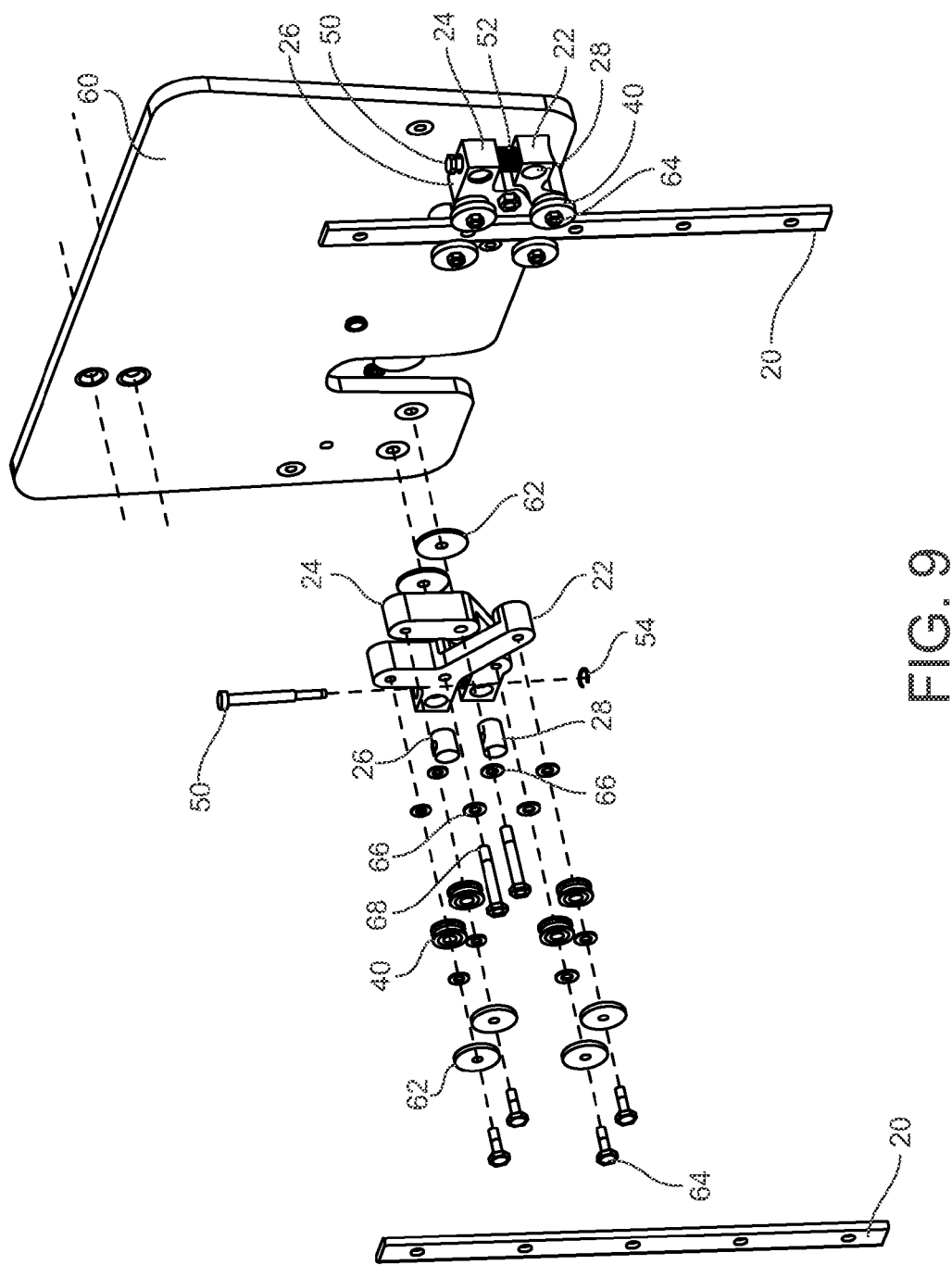
FIG. 9 is an exploded view of an embodiment of the invention.
Figure 10:
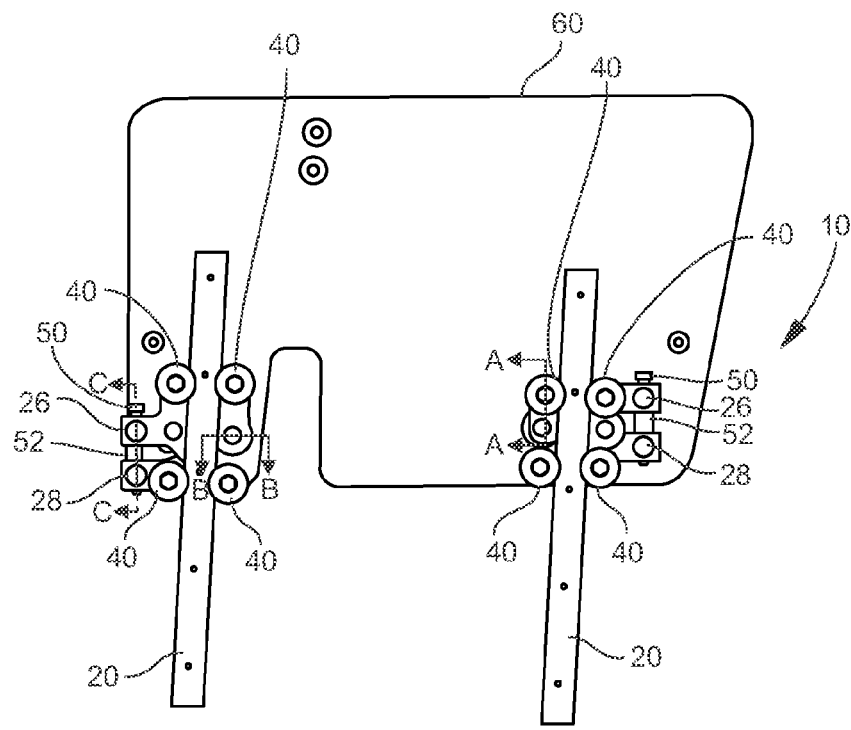
FIG. 10 is a front side view of an embodiment of the invention.
Figure 10A:
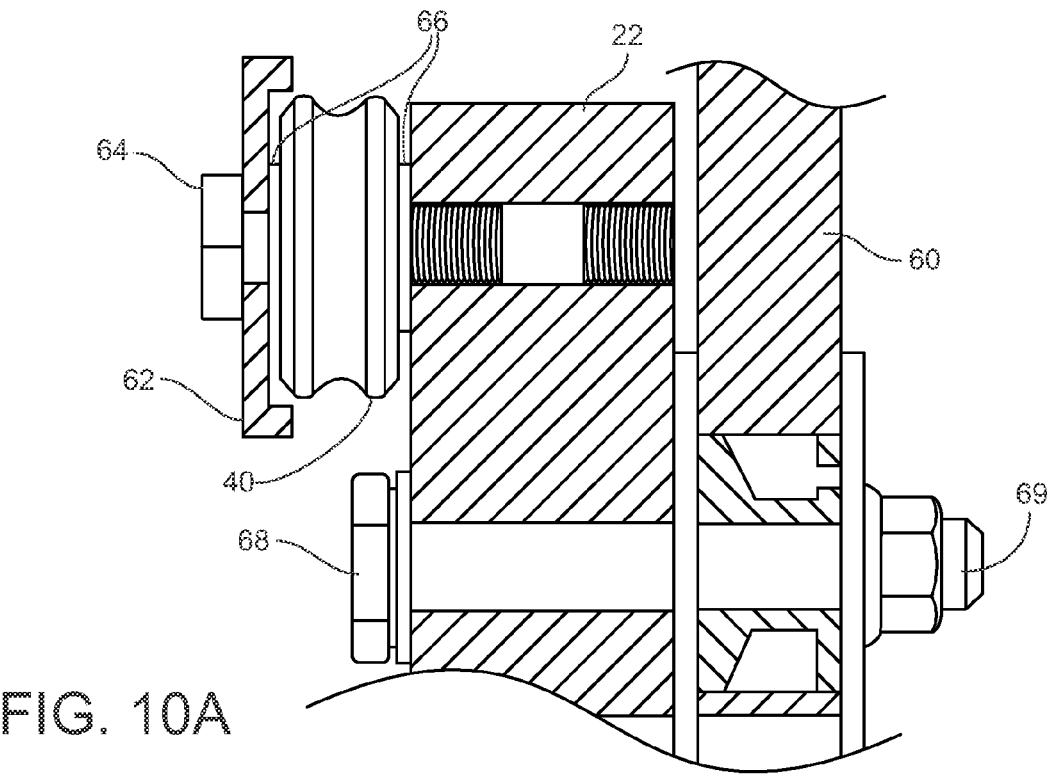
FIG. 10A is a sectional view taken along section A-A of FIG. 10.
Figure 10B:
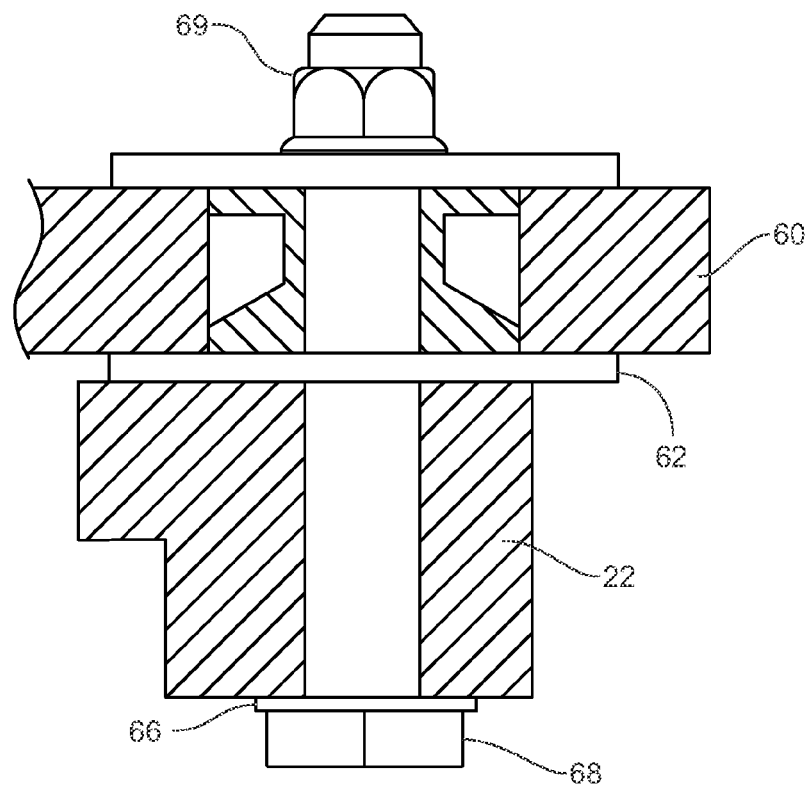
FIG. 10B is a sectional view taken along section B-B of FIG. 10.
Figure 10C:
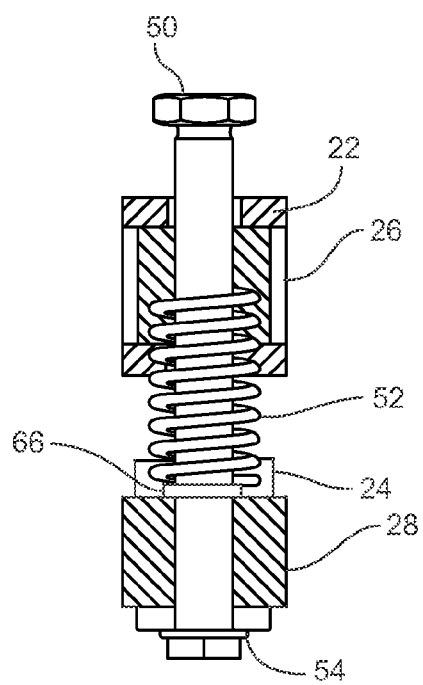
FIG. 10C is a sectional view taken along section C-C of FIG. 10.

As shown in exploded FIGS. 8 and 9, the preferred embodiment may include an armrest plate 60, a plurality of reinforced spacers 62, a plurality of roller adjustment screws 50, a plurality of lower adjustment cylinders 28, a top roller link 22, a bottom roller link 24, a plurality of bolts 64, a plurality of retainer rings 54, a plurality of washers 66, a plurality of grooved rollers 40, a plurality of bolts 68, a plurality of nuts 69, a plurality of compression springs 52, a plurality of upper adjustment cylinders 26, and a plurality of rails 40.

As shown in FIGS. 10, 10A, 10B, and 10C, bolt 64 attaches rollers 40 to top roller link 22 using spacers 62. Top roller link 22 attaches to armrest plate 60 via bolt 68 and nut 69. As especially shown in FIG. 10C, adjustment screw 50 passes through top roller link 22, upper adjustment cylinder 22, spring 52, washer 66, lower roller link 24, lower adjustment cylinder 28, and retainer ring 54.

As shown in FIGS. 11 and 12, increased roller pressure may be actuated by turning roller adjustment screw 50 direction 56. Turning roller adjustment screw 50 pushes lower adjustment cylinder 28 further downward. This movement pivots lower link 24 in an inward direction and rollers 40 towards an inward direction on the surface of rail 20. Once lower link rollers 40 bottom out on rail 40, further turning on adjustment roller adjustment screw 50 results in pushing top roller link 22 away.

Combining result of above is turning of roller adjustment screw 50 in direction 56 brings all rollers 40 towards rail 20 and it is directly proportional. More turns in direction 56 applies more force of rollers 40 on rail 20. The reverse of this procedure applies less force.

Compression spring 52 is also acting as anti-rotation force on roller adjustment screw 50 by applying constant pressure on both adjustment cylinders 26, 28 and avoids backing-off of roller adjustment screw 50 due to any vibration during normal mechanism operation.

An aircraft armrest rail roller linkage 10 according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims. It is envisioned that other embodiments may perform similar functions and/or achieve similar results. Any and all such equivalent embodiments and examples are within the scope of the present invention and are intended to be covered by the appended claims.

What is claimed is:

1. An aircraft armrest rail roller linkage apparatus comprising:
    (a) an armrest plate for attaching to an armrest assembly;
    (b) a rail attached to an aircraft seat assembly;
    (c) a top roller link, attached to the armrest plate, having an upper adjustment cylinder that is threaded and also having a pivot joint and a pair of grooved rollers diagonally disposed on either side of the pivot, the grooves meshing with the rail;
    (d) a bottom roller link attached to the armrest plate, having a lower adjustment cylinder that is unthreaded and also having a pivot joint and a pair of grooved rollers diagonally disposed on either side of the pivot, the grooves meshing with the rail;
    (e) a roller adjustment screw, having a threaded portion, and extending through both the upper and the lower adjustment cylinders, the threaded portion of the roller adjustment screw meshing with the threaded portion of the upper adjustment cylinder;
    (f) a compression spring, biasing the top and bottom roller links around the rail, disposed between the top roller link and the bottom roller link and surrounding the roller adjustment screw; and
    (f) wherein the respective pivot joints of the top roller link and the bottom roller link are positioned on opposite sides of the rail.

* * * * *